United States Patent [19]

Yoshioka et al.

[11] Patent Number: 4,729,121

[45] Date of Patent: Mar. 1, 1988

[54] UNDERWATER DETECTION SYSTEM

[75] Inventors: Takashi Yoshioka; Nobuo Fujita, both of Kobe; Hiroyuki Hamato, Amagasaki, all of Japan

[73] Assignee: Furuno Electric Company Ltd., Hyogo, Japan

[21] Appl. No.: 840,745

[22] Filed: Mar. 18, 1986

[30] Foreign Application Priority Data

Jun. 7, 1985 [JP] Japan .................. 60-86617[U]

[51] Int. Cl.⁴ .............................................. G01S 9/68
[52] U.S. Cl. ...................................... 367/113; 367/99
[58] Field of Search .................. 367/113, 88, 103, 99

[56] References Cited

U.S. PATENT DOCUMENTS 4,024,490  5/1977  Wood et al. ...................... 367/113
4,115,752  9/1978  Hertel ............................... 367/113
4,209,853  6/1980  Hyatt ................................ 367/103

Primary Examiner—Stephen C. Buczinski
Assistant Examiner—Melissa L. Koltak
Attorney, Agent, or Firm—Birch, Stewart, Kolasch & Birch

[57] ABSTRACT

An underwater detection system display underwater conditions on an indicator comprised of a monochrome cathode ray tube with two groups of different degrees of brightness. One group of different degrees of brightness is related to the amplitude of echo signals in such a way that degrees of brightness are in direct proportion to the amplitude of an echo signal. The other group of different degrees of brightness has another relationship with the amplitude of an echo signal.

13 Claims, 5 Drawing Figures

UNDERWATER DETECTION SYSTEM

BACKGROUND OF THE INVENTION

The present invention relates to an underwater detection system for displaying underwater conditions on an indicator comprised of, for example, a monochrome cathode ray tube with various degrees of brightness, depending on the amplitude of echo signals resulting from an ultrasonic search signal radiated into the water. Particularly, it relates to a detection system for displaying underwater conditions with two groups of different degrees of brightness. One group of various degrees of brightness has a relationship with the amplitude of an echo signal in such a way that degrees of brightness are in direct proportion to the amplitude of an echo signal. The other group of different degrees of brightness has another relationship with the amplitude of an echo signal.

For example, with one group of various degrees of brightness, the seabed produced strong echo signals is displayed in "white", and a large school of fish produced a medium echo signal is displayed in "light gray", and a fish school, small in size or staying distant from the water surface, producing a weak echo signal is displayed in "dark gray", and the rest of the indicating surface of the indicator is displayed in "black". With the other group of various degrees of brightness, the seabed, a large fish school, a small fish school and no objects are displayed in "dark gray", "white", "light gray" and "black" respectively.

Conventional underwater detection systems have displayed underwater conditions with one group of various degrees of brightness, the degrees of brightness being in direct proportion to the amplitude of an echo signal. These detection systems display the seabed with maximum brightness, i.e., in "white", a fish school staying close to the seabed in "dark gray" and no objects in "dark gray". Therefore, a fish school staying close to the seabed is hardly distinguished from the seabed, since the fish school displayed with lesser brightness is affected by the seabed which is displayed with maximum brightness.

SUMMARY OF THE INVENTION

Accordingly, an object of the invention is to provide an underwater detection system which is capable of distinctly displaying objects producing weak echo signals.

Another object of the invention is to provide an underwater detection system for obtaining two displays of the same underwater conditions with two groups of various degrees of brightness based on the same echo signals.

A further object of the invention is to provide an underwater detection system which selectively displays underwater conditions based on the same echo signal either with a group of several degrees of brightness or with another group of various degrees of brightness.

According to one aspect of the invention, the underwater detection system for radiating an ultrasonic search signal into the water, for receiving echo signals and for displaying underwater conditions based on received echo signals comprises (i) an analog-to-digital converter for converting an echo signal in an analog form into a first digital signal, (ii) a memory for storing the first digital signal, (iii) signal generating means for producing a second digital signal based on the echo signal, (iv) a digital-to-analog converter for converting the first and second digital signals into analog signals, and (v) an indicator for displaying the analog signals from the digital-to-analog converter.

BRIEF DESCRIPTION OF THE DRAWINGS

In the drawings.

Throughout the drawings, the same reference numerals are given to like components.

DETAILED DESCRIPTION OF THE PREFERRED EMBODIMENTS

Figure 1:
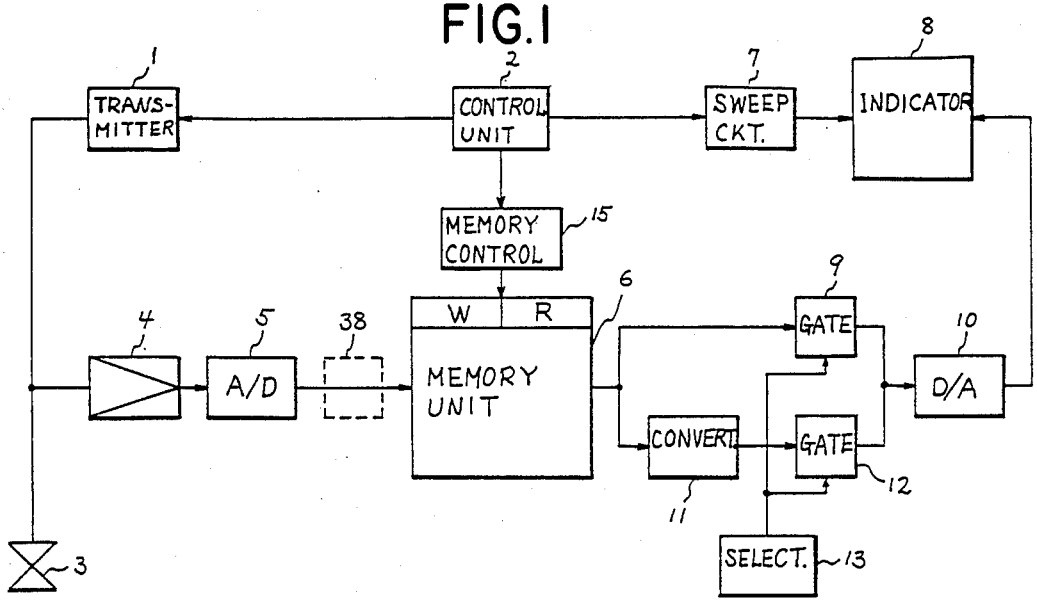
FIG. 1 shows a block diagram of an embodiment according to the present invention.

Referring to FIG. 1, a transmitter 1 transmits to a transmitting and receiving unit 3, a pulse signal with its carrier frequency of 50 KHZ, at a predetermined time period, in response to a control signal supplied from a controlling unit 2. The pulse signal is obtained by modulating in amplitude a carrier signal with a pulse lasting for about 1 ms. The transmitting and receiving unit 3 comprises an ultrasonic transducer, and radiates an ultrasonic search pulse signal into the water. The transmitting and receiving unit 3 also receives echo signals reflected from the seabed, schools of fish and other objects, and transmits them to an analog-to-digital converter ( hereinafter referred to "A-D- converter") 5 through an amplifier 4. The A-D converter 5 converts an input analog signal into a digital signal of, for example two bits (11,10,01,00), with these digital values being in direct proportion to the amplitude of an echo signal, and supplies the resultant converted signal to the input terminals of a memory unit 6. The memory unit 6 is comprised of an array of memory elements having M columns and N rows of memory elements. The memory unit 6 is controlled by a memory control 15 to successively write the echo signals resulting from a search signal emitted from and caught by the transmitting and receiving unit 3, into N memory elements of the m-th column. When a second search pulse is radiated by the transmitting and receiving unit 3 into the water, the resultant echo signals are written into N memory elements of the (m+1)-th column in the memory unit 6. In the same manner, when a j-th search pulse is radiated into the water, the resultant echo signals are successively written into N memory elements of the (m+j)-th column in the memory unit 6. After storing echo signals resulting from each of M search pulses in M columns of the memory unit 6, echo signals resulting from the next search pulse are written into N memory elements of a column, for example, m-th column in which the echo signals resulting from the oldest search pulse have been stored, thereby replacing the oldest echo signals with the newest ones. Echo signals resulting from the following search pulse are written into the memory elements of (m+1)-th column. Similarly, echo signals resulting from each of the following search pulses are written into the memory elements of each of (m+2,3,4,5---M,1,2,3, --- )-th column in this order.

The controlling unit 2 also supplies control signals to the memory control unit 15 and sweep control signals to a sweep circuit 7. The memory control unit 15 supplies write control and read control signals to the memory unit 6. The memory unit 6 outputs stored digital signals, controlled by the memory control unit 15, in synchronism with the display operation of the indicator 8. In Table 1, there is shown the relationship between the digital values produced by the A-D converter 5 and various degrees of brightness employed by the indicator 8.

TABLE 1

| Digital Output Signal from A-D Converter 5 | Brightness Produced by Indicatior 8 | Digital Output Signal from Converter 11 | Brightness Produced by Indicatior 8 |
|---|---|---|---|
| 11 | White | 01 | Dark Gray |
| 10 | Light Gray | 11 | White |
| 01 | Dark Gray | 10 | Light Gray |
| 00 | Black | 00 | Black |

Figure 2:
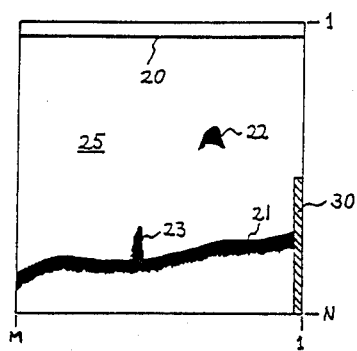
FIG. 2 shows an example of underwater conditions displayed on the indicating surface of an indicator.

The output signals from the memory unit 6 are supplied to a digital-to-analog converter ( hereinafter referred to as "D-A converter") 10 through a gate 9. The D-A converter 10 converts an input digital signal into an analog signal which is supplied to the indicator 8. The indicator 8 is comprised of, for example a monochrome cathode ray tube, with the screen thereof having M columns and N rows of picture elements, and is controlled by the sweep circuit 7 so that its electron beam is deflected both in horizontal and vertical directions. The sweep circuit 7 generates X-deflection signals for deflecting the electron beam in the horizontal direction and Y-deflection signals for deflecting the electron beam in the vertical direction. Referring to FIG. 2, the echo signals resulting from the oldest search pulse are displayed in the leftmost display line (M-th line ), and the echo signals in response to the newest search pulse are displayed in the rightmost display line (1-st line ). The echo signals resulting from the search pulses between the oldest one and the newest one are displayed between the leftmost and rightmost ones. Thus, the echo signals resulting from the search pulses 1st, 2nd, 3rd, -- M-th are displayed on the screen of the indicator 8 in display lines M-th. (M — 1)-th --- 3rd, 2nd, 1st respectively. When the echo signals in response to the next search pulse are written into the memory unit 6 and further supplied to the indicator 8, the pattern displayed on the screen moves leftward by one display line, thereby making the oldest echo signals indicated in the M-th display line disappear and indicating the latest echo signals in the rightmost 1-st line. Similarly, the displayed pattern moves leftward by one display line each time a search pulse is radiated into the water. When a digital output signal from the A-D converter is "11", the indicator 8 displays it in "white", as shown in Table 1. When a digital output signal from the A-D converter 5 is "10", the indicator 8 displays it in "light gray". Similarly, when digital output signals therefrom are "01" and "00", they are displayed in "dark gray" and "black" respectively. The indicator 8 displays underwater conditions based on the signals read out from the memory unit 6, as shown in FIG. 2.

A converter 11 converts digital input signals "11", "10", "01" and "00" into digital signals "01", "11", "10" and "00" respectively. The resultant digital signal is supplied to the D-A converter 10 through a gate 12. The D-A converter 10 converts a digital input signal into an analog signal, and supplies the resultant analog signal to the input terminal of the indicator 8. As a result, when a digital output signal from the A-D converter 5 is "11", the indicator 8 displays it in "dark gray", as shown in Table 1. When digital output signals from the A-D converter 5 are "10", "01" and "00", they are displayed in "white", "light gray" and "black" respectively. A selector 13, which is manually or automatically operated, enable either the gate 9 or the gate 12 so that the digital signals are passed therethrough.

Referring to FIG. 2, in the case where the gate 9 is selected by the selector 13 to supply the output signals from the A-D converter 5 to the D-A converter 10 as shown in Table 1, the transmission line 20 and the seabed are displayed in "white" on the indicating surface of the indicator 8. A school of fish 22 is displayed in "light gray", and a fish school staying close to the seabed is displayed in "dark gray". The rest of the indicating surface of the indicator 8 is kept in "black", showing that no objects are detected.

On the other hand, where the gate 12 is selected by the selector 13 to supply the output signals from the converter 11 to the D-A converter 10 as shown in Table 1, the transmission line 20 and the seabed 21 are displayed in "dark gray", even though the same digital output signals are produced by the A-D converter 5. The fish school 22 is displayed in "white". The fish school 23 staying close to the seabed is displayed in "light gray". The rest of the indicating surface of the indicator 8 is lit in "black".

It is now assumed that the gate 9 is selected by the selector 13 to pass the output signals from the memory unit 6 to the D-A converter 10. An ultrasonic search pulse signal is radiated into the water by the transmitting and receiving unit 3 in response to a control signal supplied from the controlling unit 2. Echo signals are caught by the transmitting and receiving unit 3, and then are amplified by the amplifier 4, and further are successively written into N memory elements of a column in the memory unit 6 after the echo signals are converted into digital signals by the A-D convertor 5. In the same manner, every time an ultrasonic search pulse is emitted into the water, echo signals are written into memory elements in the next column. The signals read out from the memory unit 6 are supplied to the indicator 8 through the gate 9 and the D-A converter 10 which converts the signals into analog signals. As a result, underwater conditions are displayed on the indicating surface of the indicator 8, as shown in FIG. 2. The transmission line 20 and the seabed are indicated in "white". The fish school 22 is lit in "light gray". The fish school 23 staying close to the seabed is indicated in "dark gray". The rest of the indicating surface of the indicator 8 is kept in "black". Accordingly, the seabed displayed in "white" interferes with the display of the fish school 23 close to the seabed so that the fish school 23 is sometimes hardly distinguished from the seabed 21.

In such a case that the fish school 23 staying close to the seabed is barely distinguished, the gate 12 is selected by the selector 13. The signals read out from the memory unit 6 are supplied to the indicator 8 through the converter 11, gate 12 and D-A converter 10. The output signals from the memory unit 6 are converted as shown in Table 1. Thus, the fish school 22 is displayed in "white". The fish school 23 staying close to the seabed is indicated in "light gray", and appears distinctly against the seabed 21 which is lit in "dark gray". Accordingly the fish school 23 staying close to the seabed 21 is more easily distinguished.

Figure 3:
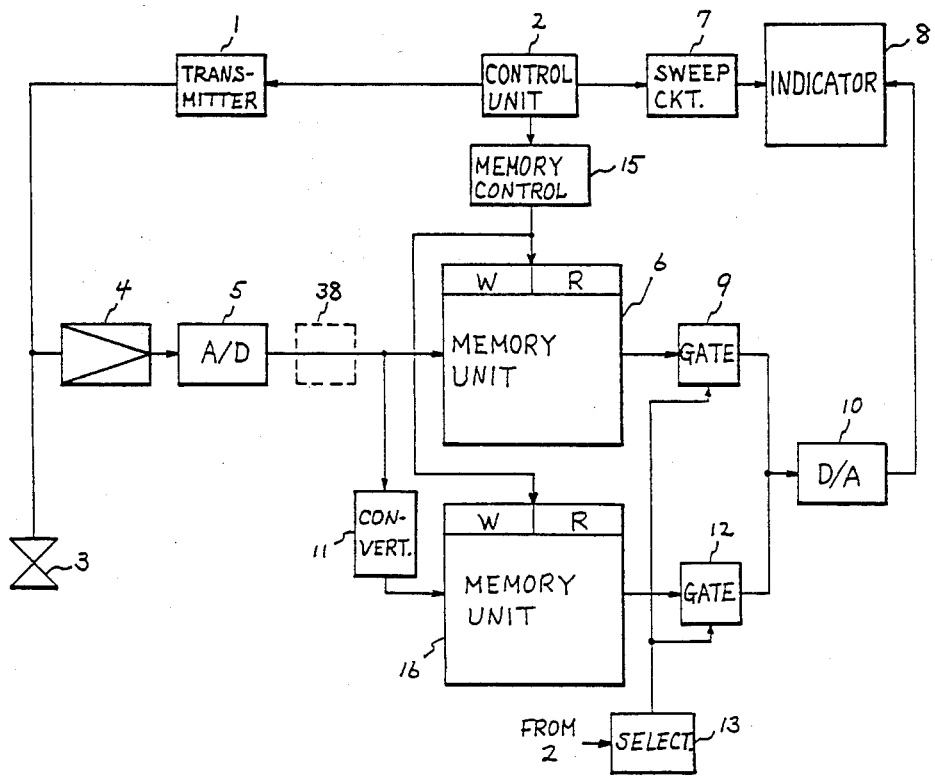
FIG. 3 shows a block diagram of another embodiment according to the present invention.

Referring to FIG. 3, the digital output signals from the A-D converter 5 are supplied to the input terminal of the memory unit 6 and also to the input of the converter 11. The converter 11 converts digital input signals "11", "10", "01" and "00" into digital signals "01", "11", "10" and "00" respectively. The converted digital signal is applied to the input of a memory unit 16. The memory unit 16 is constructed in the same way and performs the same function as the memory unit 8. The memory unit 16 successively writes the digital output signals from the coverter 11 into N memory elements of M columns, controlled by the memory control unit 15, and reads the stored digital signals to be transmitted to the gate 12. Underwater conditions are displayed on the indicator 8 with either one of two groups of various degrees of brightness selected by the selector 13, i.e., based on the output signals from the A-D converter 5 or from the converter 11, as shown in Table 1.

Figure 4:
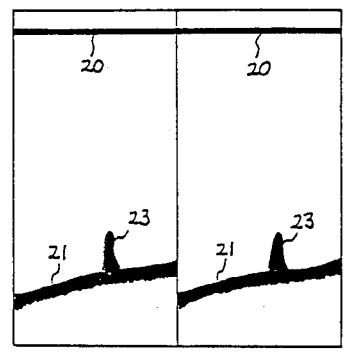
FIG. 4 shows another example of underwater conditions displayed on the indicator.

Although a pattern is displayed with a group of several degrees of brightness on the whole surface of the indicator 8 in the foregoing embodiment, two pictures based on the signals read out from both the memory units 6 and 16 can be indicated side by side on the indicator at the same time, as shown in FIG. 4. Referring to FIG. 4, on the right-half indicating surface of the indicator 8 is displayed a picture based on the output signals from the A-D converter 5. Thus, the transmission line 20 and the seabed 21 are indicated in "white", the fish school 23 is displayed in "dark gray", and the rest of the indicating surface in "black". On the left-half surface of the indicator, the transmission line 20 and the seabed 21 are indicated in "dark gray", the fish school 23 in "light gray", and the rest of the surface in "black". This is achieved by controlling the selector 13 to select the gate 9 or 12 based on the control signals supplied from the controlling unit 2. In this case, the reading operation in the memory units 6 and 16 is performed differently from the foregoing one. At the instant the gate 9 is selected, the memory unit 6 starts to read out stored digital signals, and if the gate 12 is selected, the memory unit 6 stops the reading operation, and the memory unit 16 starts to read out the stored signals therefrom.

Figure 5:
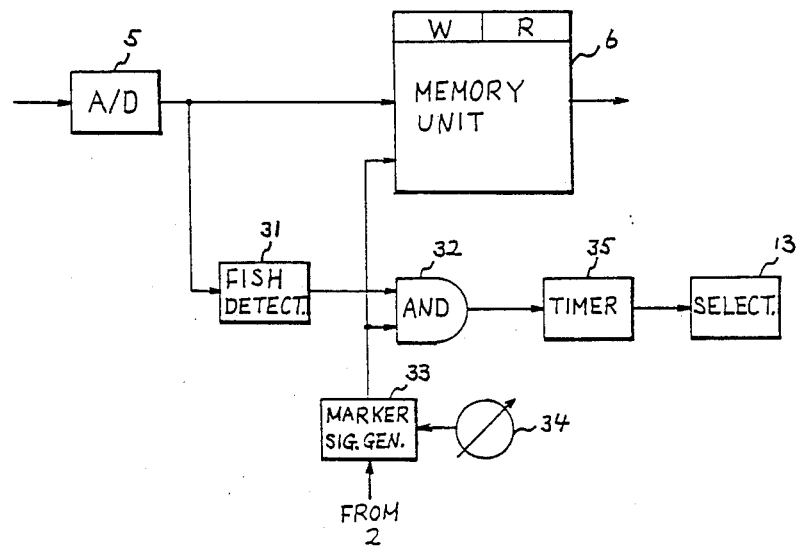
FIG. 5 shows a portion of an embodiment according to the present invention.

It should be noted that the selector 13 may also be operated automatically. Referring to FIG. 5, the digital output signals from the A-D converter 5 are supplied to the input terminal of the memory unit 6 and also to the input of a fish school detector 31. The fish school detector 31 may comprise a comparator, and produces an output signal to one input of an AND gate 32 when a digital input signal representing the amplitude of an echo signal is below a predetermined value. A marker signal generator 33 may comprise a mono-multivibrator and a flip-flop circuit, coupled thereto. The mono-multivibrator produces a pulse signal of a variable width, in response to a signal from the controlling unit 2. The pulse width is adjusted by an adjuster 34. The trailing edge of the pulse drives the flip-flop circuit to generate a marker signal to be supplied to the other input of the AND gate 32 and to an input of the memory unit 6. The marker signal is stored and read out from the memory unit 6, controlled by the memory control unit 15, in such a way that a vertical marker 30 is displayed at the right side of the indicator. The length of the vertical marker 30 is adjusted by the adjuster 34. The AND gate 32 supplies a pulse signal to a timer 35 when an echo reflected by a fish school staying within a depth range corresponding to the vertical marker 30. The timer 35 produces a pulse signal of a width, for example five seconds in response to an input signal. The selector 13 keeps the gate 12 open while the output signal from the timer 35 being applied to the selector 13. Accordingly, the selector 13 is automatically driven. The seabed 21 is displayed in "white" while a fish school is not present within the depth range covered by the vertical marker 30. When the fish school 23 is detected, the selector 13 selects the gate 12 to pass the output signals from the converter 11, thereby indicating the fish school 23 in "light gray" and the seabed in "dark gray".

It should be noted that a buffer memory unit 38 can be incorporated between the A-D converter 5 and the memory unit 6. The buffer memory unit 38, controlled by the controlling unit 2 and/or the memory control unit 15, one-time stores echo signals resulting from a radiated search signal and then supplies them to the memory unit 6, and to the converter 11. In this case, the indication operation for reading out the signals from the memory units 6 and 16 and displaying them on the indicator 8 is performed independently of the search operation for radiating a search signal into the water and receiving echo signals.

Referring to FIG. 4, although the indicating surface of the indicator is equally halved in the foregoing embodiment, the width of a picture can be widened or narrowed, thereby narrowing or widening the width of the other picture. While the invention has been described in detail and with reference to specific embodiments thereof, it will be apparent to one skilled in the art that various changes and modifications can be made therein without departing from the spirit and scope of invention.

What is claimed is:

1. An underwater detection system for radiating ultrasonic search signals into the water, for receiving echo signals and for displaying underwater conditions based on received echo signals, comprising:
   (i) an analog-to-digital converter for converting each echo signal in an analog form into a first type digital signal representative of the intensity of the converted echo signal;
   (ii) a primary memory for storing said first type digital signals,
   (iii) signal converting means, responsive to said digital signals recalled from said primary memory, for converting each said first type digital signal into a second type digital signal;
   (iv) a digital-to-analog converter for converting said first or second type digital signals into analog signals; and
   (v) indicator means for displaying the analog signals from said digital-to-analog converter on a display; said signal converting means converting said first type digital signals representative of intermediate echo signal intensities received from small objects into second type digital signals which, when converted into analog signals by said signal converting means and displayed on said indicator means, will enhance the contrast between the representation of said small objects on said indicator and the indicator background.

2. An underwater detection system as defined in claim 1 further comprising selecting means for selecting one of the first and second type digital signals and for supplying said selected signals to the digital-to-analog converter.

3. An underwater detection system as defined in claim 1 further comprising a buffer memory incorporated between the analog-to-digital converter and the primary memory for storing the first type digital signals converted from echo signals, the buffer memory one-time storing said first type digital signals and supplying them to the primary memory.

4. An underwater detection system for radiating an ultrasonic search signal into the water, for receiving echo signals and for displaying underwater conditions based on received echo signals, comprising;
 (i) an analog-to-digital converter for converting the echo signal in an analog form into a first digital signal,
 (ii) converting means for converting the first digital signal into a second digital signal,
 (iii) a first memory for storing the first digital signal,
 (iv) a second memory for storing the second digital signal,
 (v) a digital-to-analog converter for converting the first and the second digital signals into analog signals,
 (vi) selecting means for selecting one of the first digital signal from said first memory and the second digital signal from said second memory to be supplied to said digital-to-analog converter, and
 (vii) an indicator for displaying the analog signal from said digital-to-analog converter.

5. An underwater detection system as defined in claim 2 further comprising:
 (i) means for detecting small objects close to the seabed; and
 (ii) means, responsive to said means for detecting, for controlling the selecting means to select either said first type or second type digital signals for supply to said digital to analog converter.

6. The underwater detection system of claim 1 wherein said small objects include fish schools.

7. The underwater detection system of claim 5 wherein said small objects include fish schools.

8. The underwater detection system of claim 1 wherein said indicator is a display panel displaying intensities proportional to each of said first and second type codes.

9. An underwater detection system as defined in claim 4 further comprising selecting means for selecting one of the first and second digital signals and for supplying said selected signals to the digital-to-analog converter.

10. An underwater detection system as defined in claim 4 further comprising:
 (i) means for detecting small objects close to the seabed; and
 (ii) means, responsive to said means for selecting, for controlling the selecting means to select either said first or second digital signals for supply to said digital to analog converter.

11. The underwater detection system of claim 10 wherein said small objects include fish schools.

12. The underwater detection system of claim 10 wherein said indicator is a display panel displaying intensities proportional to each of said first and second type codes.

13. In an underwater detection system for receiving echo signals and for displaying underwater conditions including the locations of small objects, a method of enhancing the display of said small objects comprising:
 converting the received echo signals into digital codes which vary with the intensity of the received echo signals;
 storing the digital codes in a memory;
 converting each digital code into a new digital code so that codes representing intensities of received echo signals from small objects are converted into codes which when displayed will develop an enhanced contrast with respect to a background of said display; and
 converting the digital codes into analog signals for display, the intensity of said display varying in relation to each digital code converted.

* * * * *